UNITED STATES PATENT OFFICE.

ISAAC SANDERSON, OF MILTON, MASSACHUSETTS.

DISCOVERY IN THE MANUFACTURE OF BROWN PAPER FROM A NEW MATERIAL CALLED "SAND-GRASS."

Specification forming part of Letters Patent No. 614, dated February 22, 1838.

*To all whom it may concern:*

Be it known that I, ISAAC SANDERSON, of Milton, in the county of Norfolk and Commonwealth of Massachusetts, paper-maker, have discovered and invented a new and useful improvement in the manufacture of brown papers by the use of a new material for that purpose not used before, of which the following is intended to be a full and exact description—that is to say:

I use for this purpose a grass which usually grows in the sand upon beaches near the seashore, and above the usual high-water mark, commonly called "sand-grass" or "beach-grass." The grass is to be cut down and dried in the usual way. A convenient quantity is then to be taken and put into a vessel or cistern and boiled in a solution of lime or potash over a fire or by steam for about two hours. The solution is to be made by putting about the proportion of a peck and a half of lime or three pounds of potash to a hogshead of water. After the grass has been thus boiled it is to be taken from the vessel or cistern and cut into pieces two or three inches in length in the way and manner in which materials are usually cut for making paper. When so boiled and cut, it is to be put into the engine and beaten, and while the process of beating it is going on potash dissolved in water in the proportion of six pounds of potash to two hundred pounds of this grass, and train-oil or spermaceti-oil, in the proportion of about half a pint to the same quantity of the grass, is to be put into the engine so as to mix with the material and the water in the engine. The grass is then to be beaten and prepared in the usual way of preparing materials for making paper.

What I claim as my invention and discovery is—

The use of the said grass in and for making brown paper.

In testimony whereof I, the said ISAAC SANDERSON, hereto subscribe my name, in the presence of witnesses, whose names are hereto subscribed, on this 1st day of January, in the year of our Lord 1883.

ISAAC SANDERSON. [L. S.]

Witnesses:
    WASHINGTON MUNROE,
    JOHN W. PARKER.